CATHODE RAY TUBE DISPLAY SYSTEM

Filed Nov. 18, 1957 2 Sheets-Sheet 1

INVENTORS
WILSON P. BOOTHROYD
RALPH A. BLOOMSBURGH
BY
Robert D. Sanborn
ATTORNEY CATHODE RAY TUBE DISPLAY SYSTEM
Filed Nov. 18, 1957 2 Sheets-Sheet 2
FIG. 4.
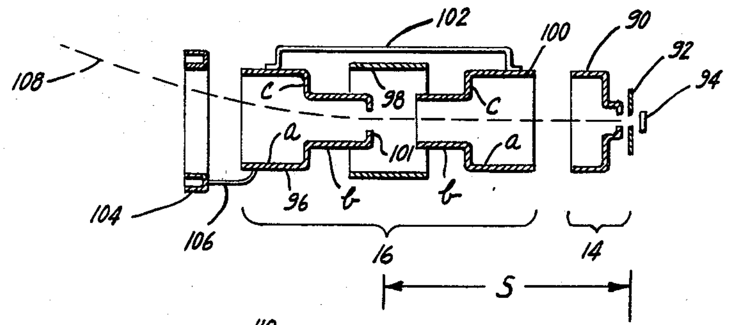
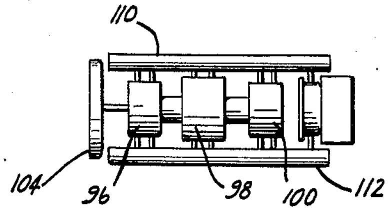
FIG. 4A.
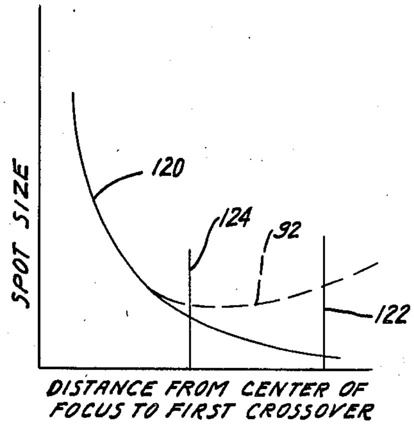
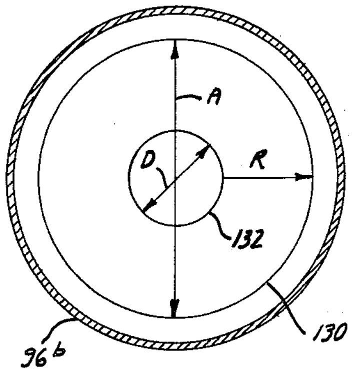
FIG. 5.
FIG. 6.
INVENTORS
WILSON P. BOOTHROYD
RALPH A. BLOOMSBURGH
BY
Robert D. Sanborn
ATTORNEY United States Patent Office 2,935,635

Patented May 3, 1960

2,935,635

CATHODE RAY TUBE DISPLAY SYSTEM

Wilson P. Boothroyd, Huntingdon Valley, and Ralph A. Bloomsburgh, Lafayette Hill, Pa., assignors to Philco Corporation, Philadelphia, Pa., a corporation of Pennsylvania Application November 18, 1957, Serial No. 697,108

9 Claims. (Cl. 313—76)

The present invention relates to cathode ray tube display systems and more particularly to improvements in the cathode ray tube-deflection yoke assembly for such systems.

The present trend in the design of television systems is to reduce as much as possible the depth of the cabinet required to house such systems. Since the limiting factor in such designs is frequently the dimensions of the cathode ray tube itself, considerable effort has been expended in reducing the over-all length of the cathode ray tube. It is current practice to employ deflection angles of the order of 110° in order to minimize the length of the tube for a given screen size. The use of such wide deflection angles places severe requirements on the beam generating, focusing and deflection means, all of which must be met in order to achieve acceptable definition in all portions of the television image. These requirements become even more severe as the deflection angle is increased. Therefore it is considered impractical at the present time to increase the deflection angle much beyond the 110° angle now employed.

We have discovered that further substantial reduction in over-all tube length may be achieved without loss of picture definition by employing the novel cathode ray tube and deflection assembly of the present invention which permits a substantial reduction in the length of the neck portion of the cathode ray tube.

Therefore it is an object of the present invention to provide a novel, compact beam forming and deflection assembly for cathode ray tubes.

It is a further object of the present invention to provide a beam forming and deflection assembly in which deflection and focusing may occur in the same axial region of the beam.

Still another object is to provide a cathode ray tube assembly in which the dimension from the tube base to the portion of the deflection yoke nearest the screen is a minimum.

These and other objects of the present invention are achieved by the provision of a novel electrostatically focused cathode ray tube of reduced neck dimension, a shielded deflection yoke assembly, and by the combination of this cathode ray tube and deflection yoke assembly in a manner such that at least a substantial portion of said electrostatic focusing means lies within the deflection fields of said yoke whereby deflection and focusing of the beam of said cathode ray tube occur in overlapping regions in the neck portion of the cathode ray tube.

For a better understanding of the present invention together with other and further objects thereof reference should now be made to the following detailed description which is to be read in conjunction with the accompanying drawings in which:

Fig. 4 is an enlarged sectional view of the electron gun structure shown schematically in Fig. 1;

Fig. 4A is an elevational view of the electron gun structure showing the supporting means therefor;

Fig. 5 is a plot which is explanatory of the operation of the system of Fig. 1; and Fig. 6 is a diagram employed to illustrate certain principles of operation of the system of Fig. 1.

Figures 1, 2, 3:
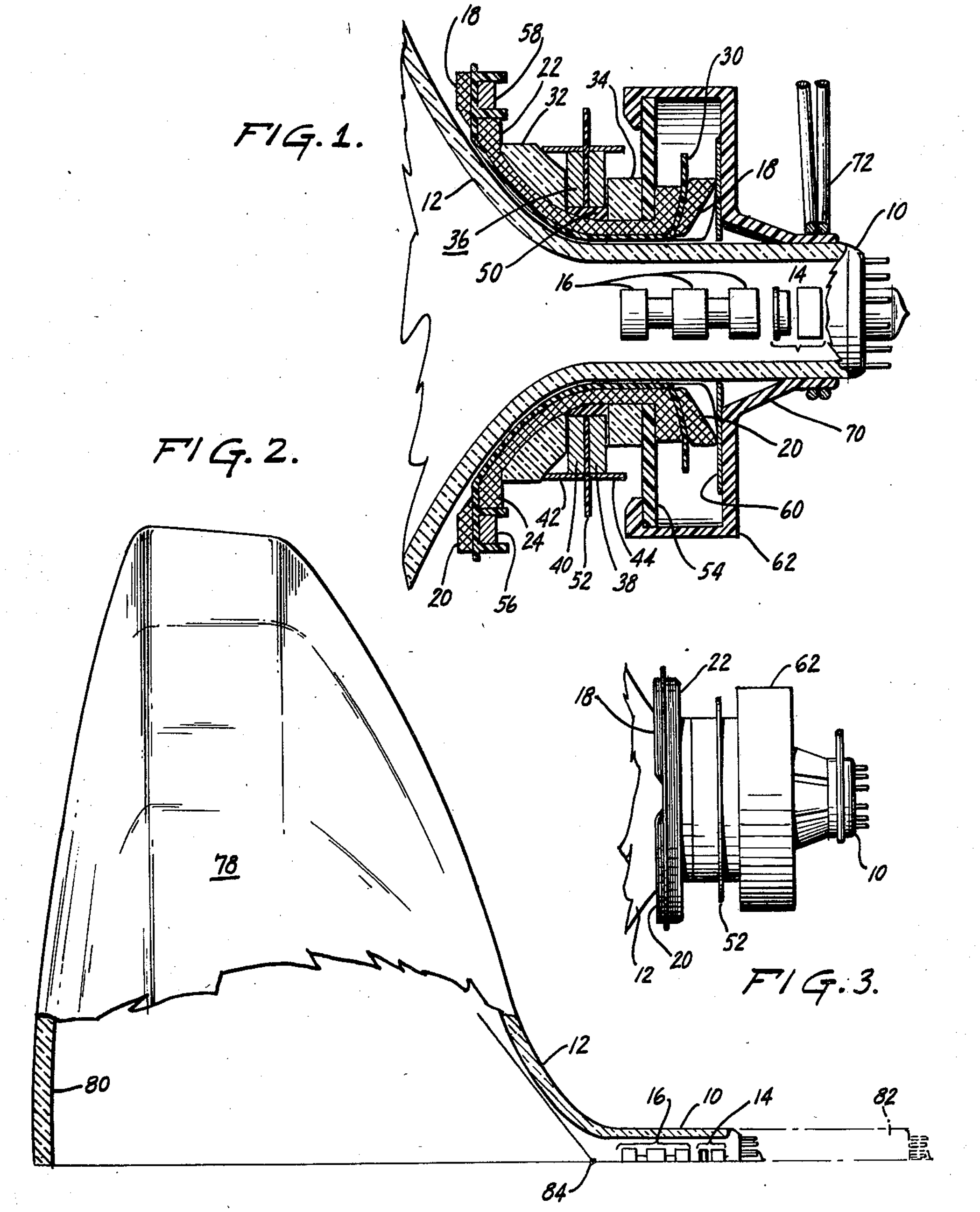
Fig. 1 is a fragmentary sectional view which shows in detail the various novel features of the present invention.
Fig. 2 is a fragmentary view, partially in section of the novel cathode ray tube which forms a portion of the present invention.
Fig. 3 is a fragmentary elevational view of the combination shown in Fig. 1.

In Fig. 1 the glass neck portion of the cathode ray tube which forms a part of the present invention is shown at 10. The neck flare of the cathode ray tube is shown at 12. Parts in Fig. 1 are shown approximately full size. Disposed within the neck 10 of the cathode ray tube are beam generating means 14 including cathode, control grid and screen grid. A three-element electrostatic focusing means is identified by the reference numeral 16. The novel beam generating means 14 employed in the present invention is described and claimed in the copending application of Gordon R. Spencer, Serial No. 691,026, filed October 18, 1957, now U.S. Patent No. 2,905,848, issued September 22, 1959. The electrostatic focusing means 16 is shown in greater detail in Fig. 4 of this application.

The magnetic deflection yoke assembly associated with neck 10 includes a pair of saddle-type horizontal deflection coils, the end turns of which are shown at 18 for the upper coil and 20 for the lower coil. Disposed at right angles to the horizontal deflection coils are the vertical deflection coils shown in section at 22 and 24. The two horizontal deflection coils 18 and 20 are separated from the two vertical deflection coils 22 and 24 by a form member 30 which supports the deflection coils in their proper position about the neck 10 of the cathode ray tube. Form member 30 may be shaped to receive small bar magnets 56 and 58 which correct for pin cushion effects in the picture tube-deflection yoke assembly.

The four deflection coils are surrounded by a yoke core which is split into two portions 32 and 34 to receive centering magnet assembly 36. Centering assembly 36 comprises two ring magnets 38 and 40 each magnetized along a diameter. Magnets 38 and 40 are rotatable relative to each other about the axis of neck 10. Rotation of magnets 38 and 40 relative to one another varies the strength of the resultant field of the two magnets which is directed across the neck of tube 10. This resultant field is a maximum when the north poles of the two rings are together and a minimum when the north pole of one magnet is adjacent the south pole of the other magnet. The direction of the net flux across the neck may be varied by rotating the two rings 38 and 40 together about the axis. In practice rings 38 and 40 are formed of two half rings to facilitate their placement in the recess between yoke portions 32 and 34. The two half rings forming ring 40 are held together by a band 42 which encircles the two half rings. Band 42 is made of a magnetic material which serves to confine the flux set up by ring 36 to the central region of the deflection yoke. Similarly a band 44, also of magnetic material, encircles the two half rings forming ring 38. A suitable insulating member 50 may be provided as a surface on which the rings may be rotated. An insulating separating member 52 may be employed between rings 38 and 40 to facilitate rotation of these magnets. Member 52 is made of insulating material in order to minimize eddy current losses in the yoke. The beam centering means just described is believed to be a preferred form for use in the present invention. However tests have shown that the present invention will also operate quite satisfactorily with simpler and less expensive beam centering means. Therefore the invention is not to be limited to the centering means shown.

An insulating terminal board 54 surrounds the deflection coils. Terminal board 54 is provided with lugs or terminals to which the ends of the deflection coils and the circuit leads associated therewith are electrically connected. Certain circuit components associated with these deflection coils may be mounted on this terminal board 54 if desired.

A laminated magnetic shield member 60 is provided adjacent the end turns 18 and 20 of the horizontal deflection coils for shielding the beam generating structure 14 from the horizontal and vertical deflection fields of the yoke. Shielding member 60 is more fully described and claimed in the copending application of Thomas V. Di Paolo, Serial No. 696,840, filed November 15, 1957. Shielding member 60 is held in position adjacent the end turns of 18 and 20 of the horizontal deflection coils by a protective member 62 which engages the outer periphery of terminal member 54 and provides a protective covering for the terminals mounted thereon. Member 62 is provided with resilient finger portions 70 which engage the neck 10 of the cathode ray tube thereby to support the yoke assembly on the neck of the cathode ray tube. Spring clamping means 72 serves to clamp the resilient fingers into firm frictional engagement with the neck 10, thereby to maintain the yoke assembly in a preset position.

One important feature of the present invention is that a substantial portion of the electrostatic focusing assembly 16 lies within the active region of the deflection yoke assembly, that is; physically within the field set up by the deflection coils 18, 20, 22 and 24. As a result the overall length of the neck 10 of the cathode ray tube can be reduced materially. As will be explained in greater detail presently, this telescoping of the components of the beam focusing and deflection elements is made possible by novel changes in the relationship between the beam generating means 14 and the focusing means 16 and further by the provision of the shield member 60 which protects the beam forming means 14 from the fringing field of the deflection coils.

The decrease in over-all length of the cathode ray tube resulting from the telescoping of the beam generating, focusing and deflection means just described will be more fully appreciated by reference to Figs. 2 and 3.

Fig. 2 is a scale drawing of a 21-inch, 110° deflection tube 78 constructed in accordance with the present invention. The screen of the tube 78 is shown at 80. Neck 10, neck flare 12 are given the same reference numerals as corresponding portions in Fig. 1. By way of comparison, the position of the base of a conventional "short-neck" 110° deflection tube having the same screen position and neck flare position is shown dotted at 82. It will be seen that, in the novel cathode ray tube 78 of the present invention, the theoretical center of deflection 84 lies in close proximity to the forwardmost element of the electrostatic focusing assembly 16. The distance from the center of deflection 84 to the focusing assembly 16 is substantially less than the axial length of the main field region of 18 and 20 or 22 and 24. As shown in Fig. 2, the distance from the extreme rearward portion of beam generating means 14 to the center of deflection is only approximately one quarter of the distance from screen 80 to the center of deflection 84.

Fig. 3 is a fragmentary view of the neck portion of the tube of Fig. 1 showing the deflection assembly in place on the neck 10 of a cathode ray tube. It will be recognized that Fig. 3 is an elevation view of the structure shown in section in Fig. 1. Therefore corresponding parts have been identified by the same reference numerals.

The beam generating means 14 and focusing means 16 of the present invention are shown in an enlarged sectional view in Fig. 4. In general the beam generating means comprises a screen grid 90, a control grid 92 and a cathode member 94. Preferably cathode member 94 is disposed with its major axis perpendicular to the electron beam in order thereby to shorten the over-all length of the electron gun. This transverse cathode structure is more fully described and claimed in the above-mentioned copending application of Spencer.

The electrostatic focusing assembly 16 comprises three axially aligned, conductive ring members 96, 98 and 100. Members 96 and 100 are each formed of two cylindrical members *a* and *b* which are of different diameters. These two cylindrical portions are joined by an annular disc member *c*. The inner ends of either or both of the smaller cylinder may be turned inwardly as shown at 101 to provide proper shaping of the electric field within the electrostatic focusing structure.

While considerable latitude is permissible in the selection of the shape of the focusing elements, certain requirements must be met. One requirement is that the over-all length of the focusing structure shall be as short as possible. A second requirement is that the electrostatic lens formed by this assembly 16 should have a relatively short focal length. This requirement is dictated by the fact that the size of the beam within the focusing assembly 16 must be small compared to the effective apertures of the elements of 96 and 100. The effective aperture of these elements may be much smaller than the physical aperture owing to nonuniformity of the electrostatic lens configuration in the vicinity of the members 96 and 100. It is known that the beam from a source such as source 14 tends to diverge as it leaves the first crossover point adjacent the region of cathode 94. Causing the electrostatic lens to have a shorter focal length will permit the beam generating source 14 to be placed closer to the focusing structure. The shorter the distance "S" from the center of focus to the position of the first crossover the smaller will be the diameter of the beam within the focusing structure 16.

Placing the beam forming means close to the focusing assembly 16 also places beam forming means in proximity to the deflection yoke. Thus shield member 60 of Fig. 1 is necessary in order to prevent the deflection fields from influencing the position of the beam prior to the time that it enters focusing assembly 16.

Returning to the physical description of the focusing assembly, members 96 and 100 are electrically connected by a strap 102. A ring getter 104 (not shown in Fig. 1) is mounted on member 96 by means of conductive strap 106. Getter 104 should be positioned so that it does not intercept any portion of the deflected electron beam, the center of which may follow a path such as dotted path 108 at maximum deflection angles. It should be noted that deflection of the beam is initiated well within the focusing assembly 16.

The means for maintaining the elements of Fig. 4 in the relative position shown has not been illustrated in Fig. 4. This supporting structure may comprise two or more insulating supports 110 and 112 extending parallel to the axis of the cathode ray tube as shown in Fig. 4A. The gun structure may be supported within the neck 10 of the cathode ray tube by means of the leads connecting to the various electrodes thereof and further by means of spring fingers engaging the interior of the neck 10 or the neck flare 12.

As an example of typical dimensions for focusing assembly 16, the over-all length of this assembly not including getter 104 may be of the order of 1⅛". Members 96 and 98 each may have a maximum diameter of approximately three-eighths of an inch and a minimum diameter of slightly less than a quarter of an inch. Member 98 may have a diameter slightly greater than three-eighths of an inch and a length of the order of one-quarter of an inch. In practice electrodes 96 and 100 are operated at a potential of the order of 15,000 volts while member 98 is operated at or near zero potential. The electrostatic lens is formed by the electric field existing between members 96 and 100 and the lower potential member 98.

Fig. 5 is a plot of the relationship between spot size and distance "S" assuming that the effective focal length of the lens is changed as "S" is changed so that the spot remains focused on the screen. Since the magnification of the apparent source of the beam is approximately proportional to the distance from the center of focus of the electrostatic lens to the screen divided by the distance "S" from the center of focus to the apparent source, it follows that the theoretical relationship between the spot size and distance S will be a hyperbola as represented as solid line 120 in Fig. 5. For this reason, many prior art systems are constructed with an "object distance" S such as 122 in an effort to achieve a small spot size. In many instances however the effective spot size at the edges of the picture is not determined by the theoretical considerations just mentioned but by aberrations in the focusing and deflection system. As a result, the actual relationship between effective spot size and distance S is as represented by broken curve 92. Therefore we have found it possible to shorten the distance S to a value as represented by line 124 without any degradation in overall picture quality. As mentioned above shortening the distance S is accomplished by shortening the effective focal length of the focusing assembly 16 and physically moving beam generating means 14 closer to the center of focus.

Fig. 6 represents schematically an end view of the focusing assembly 16. It is assumed that the focusing assembly has an imaginary limiting aperture 130 through which the electron beam 132 passes. It is assumed that a beam passing anywhere within aperture 130 will not be subjected to an objectionable amount of aberration. Therefore if aperture 130 has a diameter A and beam 132 has a diameter D then the beam may be deflected while still within the focusing assembly through a distance $$\frac{A-D}{2}$$

or R without introducing objectionable aberrations in the beam. It is obvious from Fig. 6 that it is essential that initial direction of beam 132 be aligned with the axis of the focusing assembly 16 otherwise the permissible deflection of the beam within the focusing assembly is reduced.

The operation of the invention is believed to be obvious from the foregoing detailed description of the structure.

While the invention has been described with reference to a single embodiment thereof, it will be apparent that various modifications and other embodiments thereof will occur to those skilled in the art within the scope of the invention. Accordingly we desired the scope of our invention to be limited only by the appended claims.

What is claimed is:

1. In combination, a cathode ray tube including means for forming a cathode ray beam and a unipotential electrostatic lens system for electrostatically focusing said beam, said unipotential electrostatic lens system having a short focal length, said focal length being such that the diameter of the cathode ray beam within said lens system is small compared to the smallest aperture in the two end electrodes of said unipotential lens system, and magnetic deflection means external to said cathode ray tube for deflecting said beam to form a raster, a substantial portion of said unipotential electrostatic lens system being disposed physically within said deflection means.

2. In combination, a cathode ray tube including means for forming a cathode ray beam and a unipotential lens system for electrostatically focusing said beam, said unipotential electrostatic lens system having a short focal length, said focal length being such that the diameter of said beam at said electrostatic lens system is substantially smaller than the effective aperture of said electrostatic lens system, and magnetic deflection means external to said cathode ray tube for deflecting said beam to form a raster, a substantial portion of said electrostatic lens system being disposed physically within the main field region of said deflection means whereby deflection of said beam is initiated in the region in which said beam is focused.

3. The combination of claim 2, said combination further comprising magnetic shielding means disposed about the neck of said cathode ray tube and functioning to at least partially shield said beam forming portion of said cathode ray tube from the field of said deflection means.

4. The combination of claim 2, said combination including means disposed in the same axial region as said deflection yoke and in a position closer to the screen of said cathode ray tube than said unipotential, electrostatic lens system for aligning the undeflected position of said spot with a selected point on said screen.

5. In combination, a cathode ray tube including means for forming a cathode ray beam and unipotential, electrostatic lens system immediately adjacent said beam forming means and in axial alignment therewith for electrostatically focusing said beam, said unipotential electrostatic lens system having a short focal length, said focal length being such that the diameter of said beam at said electrostatic lens system is substantially smaller than the effective aperture of said electrostatic lens system, and magnetic deflection means external to said cathode ray tube for deflecting said beam to form a raster, said deflection means functioning to create a region of relatively intense magnetic deflection field across a region of the neck of said cathode ray tube, a substantial portion of said electrostatic lens system being disposed physically within said region of relatively intense field whereby deflection of said beam is initiated in the region in which said beam is focused.

6. The combination of claim 5, said combination further comprising magnetic shielding means disposed about the neck of said cathode ray tube and functioning to at least partially shield said beam forming portion of said cathode ray tube from the field of said deflection means.

7. The combination of claim 5, said combination including means disposed in the same axial region as said deflection yoke and in a position closer to the screen of said cathode ray tube than said unipotential electrostatic lens system for aligning the undeflected position of said spot with a selected point on said screen.

8. In combination, a cathode ray tube including means for forming a cathode ray beam and a unipotential electrostatic lens system immediately adjacent said beam forming means and in axial alignment therewith for electrostatically focusing said beam, said unipotential electrostatic lens system having a short focal length, said focal length being such that the diameter of said beam within said lens system is substantially smaller than the effective aperture of said lens system, magnetic deflection means external to said cathode ray tube for deflecting said beam to form a raster, a substantial portion of said magnetic deflection means overlying the axial region occupied by said electrostatic lens system, and an apertured disc-like magnetic shield disposed on the neck of said cathode ray tube transversely to the undeflected path of said cathode ray beam and at a point intermediate the ends of said unipotential lens system and adjacent the ends of said deflection coils remote from the screen of said cathode ray tube.

9. In combination, a cathode ray tube including means for forming a cathode ray beam and a three-element, unipotential electrostatic lens system immediately adjacent said beam forming means and in axial alignment therewith for electrostatically focusing said beam, said unipotential electrostatic lens system having a short focal length, said focal length being such that the diameter of said beam within said lens system is substantially smaller than the effective aperture of said lens system, magnetic deflection means external to said cathode ray tube for deflecting said beam to form a raster, said magnetic deflection means overlying the axial region occupied by at least two forward elements of said unipotential electrostatic lens system, an apertured disc-like magnetic shield disposed on and closely encircling the neck of said cathode ray tube, said shield member being disposed immediately adjacent the rearmost end of said magnetic deflection means and in the axial region occupied by the rearmost element of said three-element electrostatic lens.

References Cited in the file of this patent

UNITED STATES PATENTS

| | | |
|---|---|---|
| 2,157,182 | Maloff | May 9, 1939 |
| 2,460,608 | Szegho | Feb. 1, 1949 |
| 2,732,511 | Dichter | Jan. 24, 1956 |
| 2,757,302 | Hughes | July 31, 1956 |
| 2,771,563 | Reinhard | Nov. 20, 1956 |
| 2,773,212 | Hall | Dec. 4, 1956 |
| 2,793,311 | Thomas | May 21, 1957 |
| 2,813,212 | Grundmann | Nov. 12, 1957 |
| 2,817,782 | Over et al. | Dec. 24, 1957 |
| 2,821,144 | Henry et al. | Jan. 28, 1958 |
| 2,825,837 | Dudley | Mar. 4, 1958 |

FOREIGN PATENTS

| | | |
|---|---|---|
| 712,254 | Great Britain | July 21, 1954 |
| 759,944 | Great Britain | Oct. 24, 1956 |